US010295361B2

(12) United States Patent
Lei et al.

(10) Patent No.: US 10,295,361 B2
(45) Date of Patent: May 21, 2019

(54) ALTITUDE INTEGRATED NAVIGATION WITH DSRC NETWORK

(71) Applicant: Ford Global Technologies, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 14/997,168

(22) Filed: Jan. 15, 2016

(65) Prior Publication Data

US 2017/0205248 A1 Jul. 20, 2017

(51) Int. Cl.
*G01C 21/36* (2006.01)
*G01C 21/28* (2006.01)
*G08G 1/0968* (2006.01)

(52) U.S. Cl.
CPC ......... *G01C 21/3694* (2013.01); *G01C 21/28* (2013.01); *G01C 21/3676* (2013.01); *G01C 21/3697* (2013.01); *G08G 1/096822* (2013.01)

(58) Field of Classification Search
CPC ................ G01C 21/3694; G01C 21/28; G01C 21/3697; G01C 21/3676; G08G 1/096822
USPC ........................................................ 701/425
See application file for complete search history.

(56) References Cited

U.S. PATENT DOCUMENTS

| 6,609,064 B1* | 8/2003 | Dean ...................... G07C 5/008 342/357.68 |
| 2001/0005810 A1 | 6/2001 | Senda et al. |
| 2004/0019412 A1* | 1/2004 | Miyamoto ............ G07B 15/063 701/1 |
| 2004/0160341 A1* | 8/2004 | Feyereisen ............. G01C 23/00 340/970 |
| 2006/0092179 A1* | 5/2006 | Sumizawa ......... G01C 21/3676 345/629 |
| 2008/0090522 A1* | 4/2008 | Oyama ................. H04W 48/12 455/41.2 |
| 2008/0136670 A1* | 6/2008 | Tengler .................... G08G 1/20 340/905 |
| 2009/0005974 A1 | 1/2009 | Lenneman et al. |
| 2010/0174451 A1 | 7/2010 | Leinung |
| 2010/0198455 A1* | 8/2010 | Hotta ....................... G08G 1/20 701/31.4 |
| 2010/0198692 A1* | 8/2010 | Hotta ..................... G01C 21/26 705/14.62 |
| 2010/0211310 A1* | 8/2010 | Hotta ................. G01C 21/3629 701/533 |

(Continued)

FOREIGN PATENT DOCUMENTS

JP    2001305953 A    11/2001
JP    2006-275619    * 10/2006

(Continued)

OTHER PUBLICATIONS

Google Machine Translation of JP 2006275619 A.

(Continued)

*Primary Examiner* — Muhammad Shafi
(74) *Attorney, Agent, or Firm* — Frank Lollo; Neal, Gerber & Eisenberg LLP; James P. Muraff

(57) ABSTRACT

The present disclosure generally relates to navigation systems and methods incorporating altitude data from a Dedicated Short Range Communications (DSRC) network.

20 Claims, 3 Drawing Sheets

(56) References Cited

U.S. PATENT DOCUMENTS

| | | | | |
|---|---|---|---|---|
| 2010/0318261 | A1* | 12/2010 | Nagatomo | G06Q 10/02 |
| | | | | 701/36 |
| 2011/0077857 | A1 | 3/2011 | Ramaswamy et al. | |
| 2013/0013204 | A1 | 1/2013 | Kazama et al. | |
| 2013/0191189 | A1* | 7/2013 | Aparicio | G07B 15/02 |
| | | | | 705/13 |
| 2013/0321392 | A1* | 12/2013 | van der Merwe | G01C 21/20 |
| | | | | 345/419 |
| 2014/0063037 | A1* | 3/2014 | Danielsson | G08G 5/0021 |
| | | | | 345/581 |

FOREIGN PATENT DOCUMENTS

| | | | |
|---|---|---|---|
| JP | 2006275619 | A | 10/2006 |
| JP | 4172213 | B2 | 10/2008 |
| JP | 4652097 | B2 | 3/2011 |

OTHER PUBLICATIONS

RITA: Intelligent Transportation Systems Joint Program Office, Core System Requirements Specification (SyRS), www.its.dot.gov/index.htm, Jun. 13, 2011, Revision A, Lockheed Martin, United States of America.
Search Report dated Jun. 29, 2017, for GB Patent Application No. GB1700492.0 (4 pages).

* cited by examiner

ALTITUDE INTEGRATED NAVIGATION WITH DSRC NETWORK

TECHNICAL FIELD

The present disclosure generally relates to an improved navigation system and methods of using the same. The improved navigation system incorporates altitude information into route options presented to the user.

BACKGROUND

In the United States, the Dedicated Short Range Communication (DSRC) network is being deployed as a part of the Intelligent Transportation System. The DSRC network will enable two forms of communications: vehicle-to-vehicle and vehicle-to-infrastructure. The aim of the DSRC network is to reduce fatalities, injuries, property destruction, time lost in traffic, fuel consumption, among others.

Navigation systems in vehicles allow the user to select routes to best suit the particular user's interests or needs. For example, prior navigation systems are capable of presenting different travel routes and ranking those routes based on the estimated travel time. As another example, prior navigation systems are capable of presenting travel routes that avoid the user incurring highway tolls.

Recreational drivers often desire to select travel routes according to the type of desired driving experience. The present disclosure notes that information embedded in DSRC network infrastructure may be used to enhance a driver's experience through optimization of a navigation route.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Exemplary embodiments provide systems and methods for vehicle navigation using at least altitude data from a DSRC network. According to one embodiment, a vehicle navigation system comprising a DSRC transceiver enabled to receive and transmit messages; a processor enabled to execute instructions to perform the steps: sending to a roadside system a DSRC message, receiving from the roadside system a DSRC message that contains altitude data from infrastructure located in close proximity to the associated navigation route, and sending a message with a plurality of navigation routes to the on-board DSRC system of the vehicle. The processor may optionally further be enabled to perform the step of receiving from the on-board DSRC system of the vehicle a navigation request message and/or dynamically communicate with the DSRC network and the display interface to show the real time location and altitude of the vehicle. This embodiment may further comprise a display interface configured to receive the message with a plurality of navigation routes and display the plurality of navigation routes to a user.

According to a further embodiment, a vehicle navigation system comprising: a display interface configured to display a plurality of navigation routes and associated altitude data.

In embodiments employing a display interface, the display interface is configured to display navigational routes. The display routes may be scale and/or color coded. When scale coded, a scale of 1 to 10 may be used to communicate altitude data. In preferred embodiments, altitude data is obtained from a DSRC network, particularly roadside infrastructure of the DSRC network. Altitude data may be located within a central database in the DSRC network. Altitude data may be presented in various ways according to the present disclosure, including the aggregate change of altitude along a navigation route.

According to still further embodiment, a method of selecting a desired navigation route comprising a DSRC system on-board a vehicle with an on-board Global Positioning System (GPS): transmitting an identifying message to the roadside computer system; receiving a message from the roadside computer system including altitude data; and displaying navigation routes along with associated altitude data. In preferred embodiments, the altitude data is obtained from infrastructure located in close proximity to the associated navigation route. In other preferred embodiments, a method comprises or further comprises displaying navigation routes along with associated altitude data comprises displaying color coded altitude data or displaying scale coded altitude data on a scale from 1 to 10.

In methods of the present disclosure, the user may select one of the navigation routes along with associated altitude data. The methods may further comprise the DSRC system on-board the vehicle displaying only the selected navigation routes along with associated altitude data. The DSRC system on-board the vehicle may dynamically display the real time location and altitude of the vehicle.

BRIEF DESCRIPTION OF THE DRAWINGS

For a better understanding of the invention, reference may be made to embodiments shown in the following drawings. The components in the drawings are not necessarily to scale and related elements may be omitted to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

Navigation System

Figure 1:
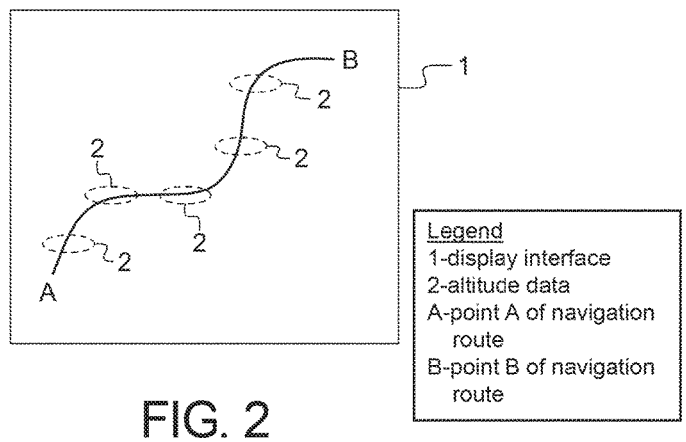
FIG. 1 depicts an embodiment of a display the present vehicle navigation system showing a route from Point A to Point B.

While the vehicle navigation system of the present disclosure may be embodied in various forms, the Figures show and this Specification describes some exemplary and non-limiting embodiments of the vehicle navigation system. The present disclosure is an exemplification of the vehicle navigation system and does not limit the vehicle navigation system to the specific illustrated and described embodiments. Not all of the depicted or described components may be required, and some embodiments may include additional, different, or fewer components. The arrangement and type of the components may vary without departing from the spirit or scope of the claims set forth herein.

The systems and methods provided herein in accordance with one or more aspects of the present disclosure are based on a Dedicated Short Range Communications network or DSRC network, which is known to one of ordinary skill. DSRC is a wireless communication protocol or system, mainly meant for transportation, operating in a 5.9 GHz spectrum band. More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications (GPRS, 3G, LTE, among others), and short range radar, allowing vehicles to communicate their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or propose some variation of the IEEE 802.11a base wireless technology. The term DSRC will be used throughout herein. However, besides the pure DSRC system it is also meant to cover dedicated wireless communication systems between cars and/or roadside infrastructure system, which are integrated with GPS and are based on an IEEE 802.11 protocol for wireless local area networks (such as 802.11p).

The present vehicle navigation system 402 incorporates altitude data from the DSRC network 410. In embodiments, the vehicle navigation system 402 incorporates altitude data from DSRC network infrastructure 414, which is optionally stored within a central database 412. The present vehicle navigation system 402 is configured to be integrated into a vehicle, such as a personal automobile.

In embodiments, the present vehicle navigation system 402 comprises a DSRC transceiver 404 and a processor 406. In other embodiments, the present vehicle navigation system may solely or further comprise a display interface 1.

Figure 2:
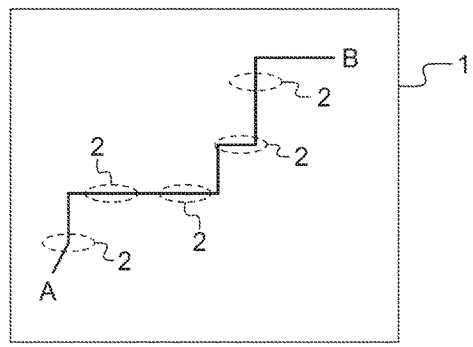
FIG. 2 depicts further embodiment of a display of the present navigation system showing an alternate route from Point A to Point B.
Figure 3:
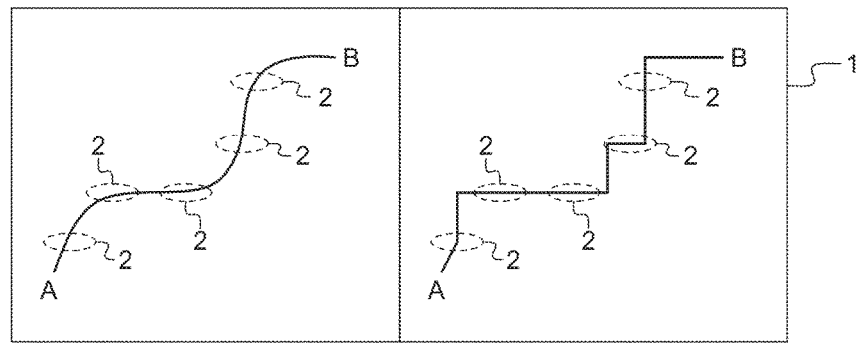
FIG. 3 depicts a still further embodiment of a display of the present navigation system showing a plurality of routes from Point A to Point B.
Figure 4:
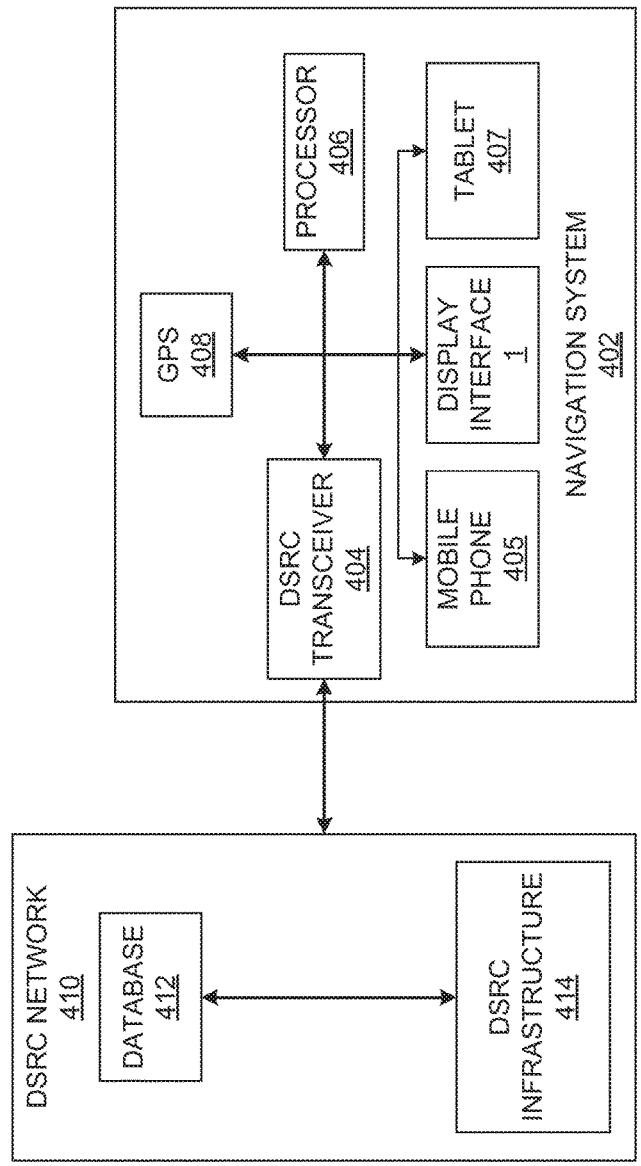
FIG. 4 depicts an embodiment of the present vehicle navigation system.
Figure 5:
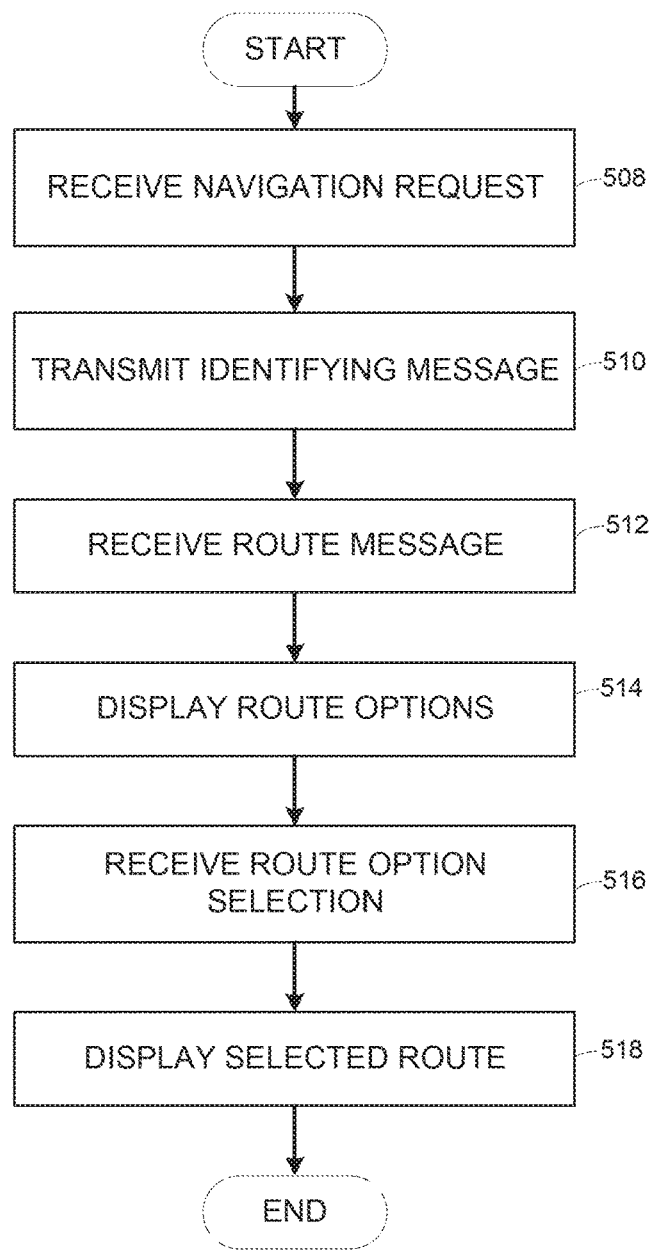
FIG. 5 is a flowchart representative of a method of employing the present vehicle navigation system.

FIGS. 1 through 3 depict different embodiments of the display interface 1 of the present vehicle navigation system. FIG. 1 shows a navigation route from Point A to Point B displayed on a display interface 1. Along the route from Point A to Point B, altitude data 2 may be presented. In this embodiment, the altitude data 2 is presented at discrete locations along the navigation route. The altitude data may be presented in various other formats. In this embodiment, the altitude data 2 is presented as colored ovals or circles along the navigation route. For example, a deep green may correspond to a low altitude where a red may correspond to a high altitude. In addition or alternatively, the ovals may be scale coded with altitude data. For example, each oval or circle may contain a number from 1 to 10 that represents relative altitude. In this example, a value of 10 would represent a high altitude where a value of 1 would represent a low altitude. Other scales are contemplated, for example, 1 to 5, 1 to 10 or 1 to 100 may be used in the present systems and methods. By displaying altitude data in color and/or scale coded manner, a user can immediately view the altitude changes along a navigation route prior to selecting a navigation route.

FIG. 2 shows the alternate route from Point A to Point B displayed on the display interface 1. As in FIG. 1, FIG. 2 shows altitude data 2 at discrete locations along the navigation route. It is contemplated that the user may toggle from the route shown in FIG. 1 and the route shown in FIG. 2 prior to making a selection.

FIG. 3 depicts an alternate embodiment of the display interface 1 of the present vehicle navigation system. FIG. 3 shows that the different route options may be displayed side-by-side for comparison, which may be in addition or in place of toggling between views.

In an embodiment of the present vehicle navigation system 402, a DSRC transceiver 404 is located on the exterior of the vehicle. In preferred embodiments, the DSRC transceiver 404 is located on the roof of the vehicle. The DSRC transceiver 404 is in communication with a processor 406 in the vehicle computer. The system 402 may further comprise a GPS system 408 and/or internal vehicle sensors. A GPS system 408 may also be an aspect of the present vehicle navigation system 402. The GPS system 408, when present, is also in communication with a processor 406 in the vehicle computer. Internal sensors may also be present. These internal sensors collect environmental and diagnostic information and communicate that information to the vehicle computer. Data from the DSRC transceiver 404, GPS system 408, and internal sensors is compiled and analyzed before being displayed on a display interface 1.

The present vehicle navigation system is intended to be accessed by a user. The user may be the driver or a vehicle occupant. In embodiments, the user may access the present navigation system through a display interface 1. In other embodiments, the user may access the present navigation system through a mobile phone 405 or tablet 407. The user may access the present navigation system to (1) request a navigation route and corresponding altitude data (block 508); (2) view a one or more navigation routes with corresponding altitude data (block 514); (3) select one navigation route with corresponding altitude data (block 516); and/or (4) view real-time GPS and/or DSRC location data showing the vehicle location and/or corresponding altitude data (block 518).

"Altitude data" as used herein means data received from the DSRC network that corresponds to the altitude of known structures (i.e., infrastructure) in close proximity to a navigation route. In embodiments, altitude data may further comprise data received from the DSRC network that corresponds to the altitude of other vehicles that are or have been located in close proximity to a navigation route. In embodiments, the altitude of known structures is not the altitude of the structure itself, but the altitude of the road surface in the navigation route. Altitude data may be stored in a central database in communication with the DSRC network.

Altitude data may be presented to a user in many ways. For example, altitude data can be presented at discrete positions along a navigation route and color- or scale-coded as shown in FIGS. 1-3. Alternatively, altitude data can be presented as a delta between the highest point and the lowest point along a navigation route. Alternatively, altitude data may be presented as an aggregate or average of all the deltas between each altitude value. Alternatively, altitude data can be presented as summary classifiers, such as "Most Altitude Changes", "High Altitude Changes", "Moderate Altitude Changes", "Low Altitude Changes", "Hilly", "Flat", "High Altitude Route", "Low Altitude Route", and others.

Navigation Method

Any of the systems disclosed herein may be used in the present navigation methods.

In a method employing the present navigation system, a user sends a request to the DSRC network for a route calculation to a destination through the display interface 1, mobile phone 405, or tablet 407. The DSRC network may have a "service center" to process navigation requests such as these. The DSRC network calculates route options along with altitude data from DSRC network infrastructures on the route. Those route options are then sent to the vehicle and displayed on the display interface 1, mobile phone 405, or tablet 407 for the user to select.

One method employing the present navigation system comprises the user requesting navigation from Point A to Point B from the display interface 1 (block 508). The display interface 1 sends a message to a processor in the vehicle computer to send a message to the DSRC network for navigation information (block 510). The request to the DSRC network may include longitude and latitude data corresponding to the vehicle's actual location or desired starting point. Once the request is received by the DSRC network from the vehicle's DSRC transceiver, route options are retrieved from a central database that includes at least longitude, latitude, and altitude data from all of the DSRC network infrastructures in close proximity to the navigation routes. A plurality of route options are then relayed to the vehicle computer processor (block 512). After proper formatting, the navigation routes are displayed on the display interface 1, mobile phone 405, or tablet 407 for the user to evaluate (block 514). The user may then select the desired route (blocks 516, 518).

What is claimed is:

1. A vehicle navigation system comprising:
  a DSRC transceiver;
  a processor configured to:
    send to a DSRC network a first DSRC message comprising a real-time vehicle location; and
    receive from the DSRC network a second DSRC message comprising navigation routes and altitudes for discrete locations along the navigation routes; and
  an interface to:
    display the navigation routes and the altitudes;
    toggle between the navigation routes;
    receive a navigation route selection; and
    show the real-time location and a corresponding altitude utilizing dynamic communication with the network.

2. The vehicle navigation system of claim 1, wherein the processor is further configured to:
  receive a navigation request message via the interface.

3. The vehicle navigation system of claim 1, wherein the interface is configured to display the navigation routes side by side.

4. The vehicle navigation system of claim 3, wherein aspects of each of the navigation routes that are displayed are color coded based on the altitude data.

5. The vehicle navigation system of claim 4, wherein the navigation routes that are color coded route options are further scale coded on a scale of 1 to 10 based on the altitudes.

6. The vehicle navigation system of claim 1, wherein altitude data of the altitudes is located on a central database within the DSRC network.

7. The vehicle navigation system of claim 1, wherein the altitudes include an altitude of a road for each respective one of the navigation routes.

8. The vehicle navigation system of claim 1, further comprising a global positioning system (GPS) receiver in communication with the processor, wherein the processor receives the real-time location from the GPS receiver.

9. The vehicle of claim 1, further comprising at least one of a mobile phone and a tablet to display the navigation routes and the altitudes for the discrete locations along the navigation routes.

10. A method for a vehicle, comprising:
  transmitting, via a transceiver, a current location to a DSRC network;
  receiving, via the transceiver, navigation routes with corresponding altitude data at discrete locations along the navigation routes from the DSRC network;
  toggling, via a processor, between displaying the navigation routes with the corresponding altitude data;
  receiving a selection of one of the navigation routes; and
  dynamically displaying a real-time location and altitude along the selected navigation route.

11. The method of claim 10, wherein the corresponding altitude data is obtained from infrastructure located in close proximity to each respective navigation route option.

12. The method of claim 10, wherein the altitude data is color coded.

13. The method of claim 10, wherein the altitude data is scale coded on a scale from 1 to 10.

14. The method of claim 10, wherein the navigation route options and the corresponding altitude data are displayed via one or more of a display interface, a mobile phone, or a tablet computer.

15. A vehicle navigation system comprising:
  a display interface configured to:
    receive an input requesting a navigation route option;
    transmit the input to a DSRC transceiver for transmission to a DSRC network;
    receive a plurality of navigation route options with corresponding altitude data from infrastructure located in close proximity to the navigation route options;
    display the plurality of navigation routes and corresponding altitude data, the altitude data being at discrete locations along the navigation routes;
    toggle between the multiple navigation route options;
    receive a selection of one of the navigation route options to identify a selected navigation route option; and
    dynamically show a real-time location and a real-time altitude of a vehicle that is enabled by dynamic communication between the display interface and the DSRC network.

16. The vehicle navigation system of claim 15, wherein the altitude data comprises an aggregate change of altitude along the plurality of navigation route options.

17. The vehicle navigation system of claim 15, wherein the altitude data is color coded based on altitude data from DSRC network infrastructure.

18. The vehicle navigation system of claim 15, wherein the altitude data is scale coded on a scale of 1 to 10.

19. The vehicle navigation system of claim 15, wherein the input includes a real-time vehicle location and further comprising a global positioning system (GPS) receiver in communication with the display interface to determine the real-time vehicle location.

20. The vehicle navigation system of claim 15, further comprising at least one of a mobile phone or a tablet to display the plurality of navigation routes and corresponding altitude data.

* * * * *